United States Patent [19]

Quinn

[11] 4,067,024
[45] Jan. 3, 1978

[54] CALCULATOR

[75] Inventor: Peter T. Quinn, Littleton, Colo.

[73] Assignee: Honeywell, Inc., Minneapolis, Minn.

[21] Appl. No.: 665,992

[22] Filed: Mar. 11, 1976

[51] Int. Cl.$^2$ ............................ G03B 7/08; G06C 3/00
[52] U.S. Cl. ...................................... 354/23 R; 354/32; 235/64.7
[58] Field of Search .................... 354/22, 23 R, 32, 33, 354/42, 49, 59; 235/64.7, 74, 88

[56] References Cited

U.S. PATENT DOCUMENTS

| | | | |
|---|---|---|---|
| 1,259,373 | 3/1918 | Dice | 235/64.7 X |
| 2,557,478 | 6/1951 | Smith | 235/64.7 X |
| 2,879,691 | 3/1959 | Faulhaber | 354/22 X |
| 2,999,635 | 9/1961 | Robertson | 235/74 X |
| 3,769,888 | 11/1973 | Quinn | 235/64.7 X |

*Primary Examiner*—L. T. Hix
*Assistant Examiner*—M. L. Gellner
*Attorney, Agent, or Firm*—Allegretti, Newitt, Witcoff & McAndrews

[57] ABSTRACT

An improved calculator structure primarily for use with photographic apparatus is disclosed. A base member carries therein certain electronics including a light sensing device which receives light from an electronic flash associated with a camera and reflected from the subject to be photographed through an aperture in the base and through one of a plurality of apertures carried by a top member which is rotatable with respect to the base about a first axis. Carried by the base member are a first set of indicia indicative of the maximum distance from camera to subject available from the electronic flash being used. The first set of indicia are viewable through a window carried by the top member. A middle member is carried by the top member and is rotatable about a second axis displaced from the first axis. The middle member carries a second set of indicia indicative of various ASA film speeds and these are also viewable through the window in the top member. The middle member also carries a third set of indicia indicative of various F stop settings. These are viewable through a cutaway portion of the top member and in cooperation with an indicia bearing means mounted on the base member.

11 Claims, 4 Drawing Figures

CALCULATOR

BACKGROUND OF THE INVENTION

The present invention relates to a calculator device for use with a camera and an electronic flash to provide the photographer with information relating the maximum distance over which he may take an acceptable photograph with his electronic flash unit with the ASA speed number of the film he is employing and the F stop setting he desires to use.

Equipment for providing information of this sort is old in the art. For example, see my U.S. Pat. No. 3,769,888, filed December 6, 1971, and issued Nov. 6, 1973, entitled "COMPUTER FLASH LIGHT SENSING APPARATUS" assigned to the assignee of the present invention. This prior art calculator generally performs the same functons as the present invention but does so with equipment which is more complicated in nature, is difficult to assemble, and which uses a relatively high number of separate pieces of equipment in order to accomplish its function. All of the disadvantages make the equipment more costly. For example, the calculator of the above referenced patent employs a base member and three separately rotatable other members, all mounted about a common axis. In order to prevent rotation of one or more of these members when other members are being rotated, a complicated arrangement of biasing springs and various locking grooves cooperating with locking teeth are provided.

An object of the present invention is to provide a simple and less costly calculator for use with a camera and electronic flash which employs fewer parts, is easier to assemble, and avoids the necessity of biasing springs and locking arrangements employed by the prior art.

SUMMARY OF THE INVENTION

The apparatus of the present invention includes a cup shaped base member which carries a hub substantially centrally located in the bottom thereof to provide a first axis for rotation. A top member is provided with an axle that extends into the hub of the base member so as to allow the top member to rotate with respect to the base member about the first axis. The base member carries a first set of indicia indicative of the maximum distance from camera to subject which is available with a given electronic flash unit. These indicia are viewable through a window in the top member. The top member also carries an extension in which a plurality of apertures are provided, each being of different size. Rotation of the top member with respect to the bottom member causes these apertures to move adjacent an aperture in the base member so as to allow different amounts of light to enter into the interior portion of the calculator.

The top member also carries a raised portion or boss to provide a second axis of rotation spaced from the first axis of rotation. A central disc member is provided with an aperture that cooperates with the boss on the top member so that the central disc member may rotate about the second axis with respect to the top member. The central disc member carries a set of indicia indicative of the ASA film speed which indicia are viewable through the window in the top member. The central disc member also carries a set of indicia indicative of the various F stop settings that may be used. The second set of indicia are viewable through a cutaway portion of the top member and cooperate with an indicator pointer located on the base member to provide the desired information for the photographer. Since the central disc member is mounted for rotation about a second axis spaced with respect to the first axis rotation of the top member does not cause rotation of the central disc member nor does rotation of the central disc member about the second axis cause rotation of the top member with respect to the base member. This arrangement thus avoids the necessity of having biasing means and interlocking arrangements to prevent undesired rotations.

DETAILED DESCRIPTION OF THE PREFERED EMBODIMENT

Figure 1:
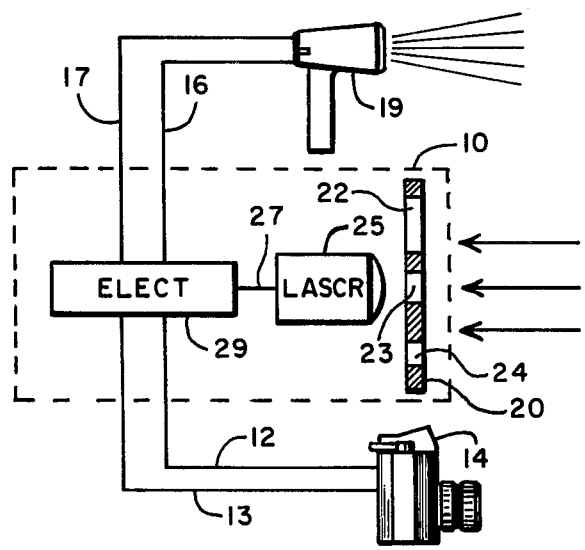
FIG. 1 schematically shows the connections between the calculator of the present invention and the photographer's electronic flash unit and camera.

FIG. 1 shows the calculator 10 of the present invention connected by means of conductors 12 and 13 to a camera 14 in a manner similar to the connection of the camera switch to the light sensing circuit in the above-mentioned U.S. Pat. No. 3,769,888 and by means of conductors 16 and 17 to an electronic flash device 19 in a manner similar to the connection of the light sensing circuit to the flash circuit of the above-mentioned U.S. Pat. No. 3,769,888. Within the calculator 10 there is a member 20 in which there is provided a plurality of apertures 22, 23 and 24 to admit light from the subject being photographed to an optical means and light sensing device 25 which may be a lens and light actuated silicon controlled rectifier labelled LASCR. The light sensing device 25 is shown connected by a connection 27 to a box 29 containing the electronics of the system and labelled "ELECT" and which may be the same as the light sensing circuit of the above-mentioned U.S. Pat. No. 3,769,888. Further electronics (not shown) similar to the flash circuit of the above-mentioned U.S. Pat. No. 3,769,888 may be included in the flash device 19.

In operation, when the photographer desires to take a picture, he operates the elements of the calculator to provide him with the necessary information to determine the maximum distance he can successfully take a picture with the particular electronic flash unit he is employing and the ASA speed of his film in conjunction with the F stop number desired. His settings will provide one of the apertures in member 20 to come adjacent the lens portion of the light sensitive device 25 so that a certain predetermined portion of the light reflected from the subject to be photographed will be received by the light sensitive device. Having set the apparatus, the photographer will then depress the contacts on the camera provided to initiate the taking of a picture. The closing of this switch produces a signal from the camera to the electronics box 29 of the calculator 10 via the lines 12 and 13 and from the electronics box 29 to the electronic flash 19 via lines 16 and 17 to initiate the flash of the electronic flash unit. Light produced by the electronic flash unit is reflected from the subject being photographed and passes to the light sensitive device 25 through the aperture 23. Light sensitive device 25 produces a signal to the electronics box 29 via connection 27 and causes the electronics 29 to send a signal to the electronic flash 19 via lines 16 and 17 when the amount of light received from the subject to be photographed has reached a certain value. The signal to the electronic flash 19 causes the flash to terminate or quench and thus assure that the light received by camera 14 does not overexpose the film.

The above described apparatus is more completely discussed in copending application of Dennis J. Wilwerding, now U.S. Pat. No. 3,980,924, entitled "REMOTE LIGHT SENSOR FOR ELECTRONIC FLASH UNITS" and assigned to the assignee of the present invention. The electronics in box 29 and the light sensitive device 25 in the calculator 10 of the present invention may be the same as that found in FIG. 2 of the above referenced copending application or may be that employed in my above referred to U.S. Pat. No. 3,769,888.

In order to determine the proper distance and F stop setting for obtaining the proper exposure of the photograph, the calculator structure of the present invention is provided and will now be described with references to FIGS. 2, 3 and 4.

Figure 2:
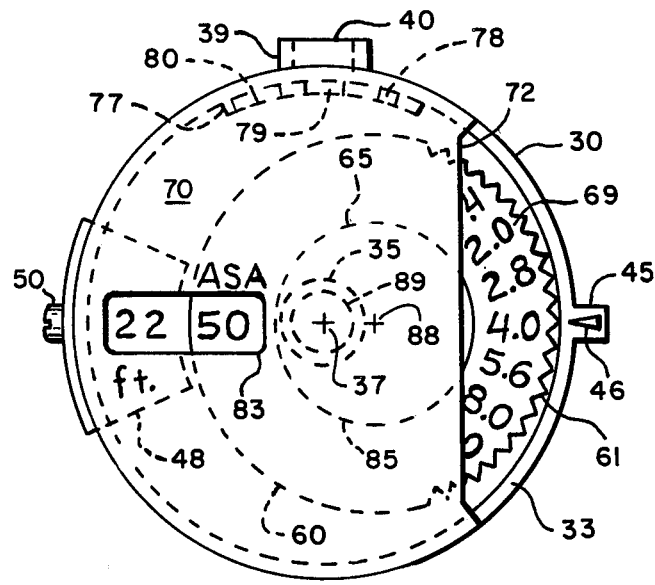
FIG. 2 is a top view of the calculator of the present invention.
Figure 4:
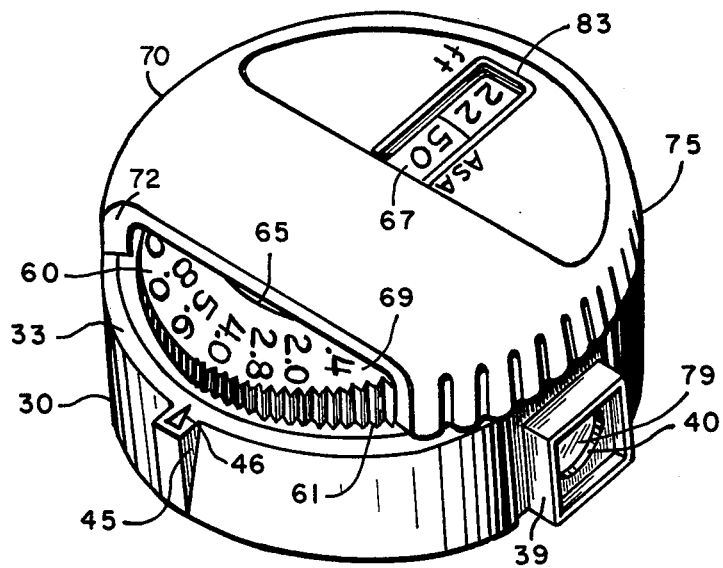
FIG. 4 is a perspective view of the assembled calculator of the present invention.
Figure 3:
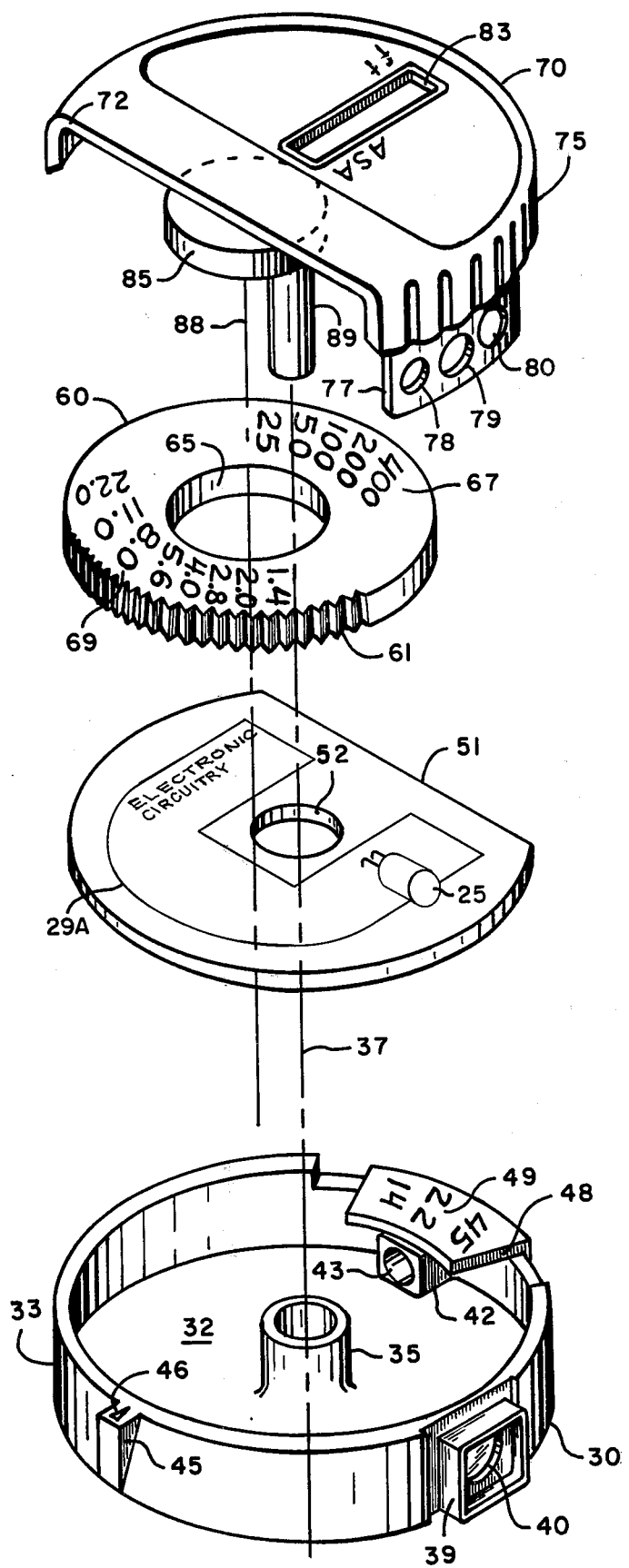
FIG. 3 is an exploded view showing the various parts of the calculator.

In describing the apparatus of FIGS. 2, 3 and 4, the same reference numerals will be used to indicate the same structures in each of the FIGURES. The FIGURES show a base member 30 having a bottom portion 32 and a generally cylindrical side wall 33. Extending from the bottom portion of the cup shaped member 30 is a hub 35 to provide for rotation about a first axis 37.

Sidewall 33 has a generally square shaped protrusion 39 in which there has been cut an aperture 40 to admit light into the interior of the cup shaped base member 30. Also formed in the wall 33 is an inwardly extending protrusion 42 through which an opening 43 has been cut to provide access for electrical connections (not shown) from the interior of the cup shaped base member 30 and the camera and photographic flash equipment with which the calculator is to be used. Also formed in the wall 33 is a ridge 45 carrying along a top portion thereof an observing portion or indicator means such as arrowhead 46.

Carried along the top edge of the wall 33 of cup shaped base member 30 is an inwardly extending member 48 carrying indicia 49 representative of maximum distances from camera to subject available with various electronic flash equipment. In the present case there is shown the indicia 14, 22 and 45 which are useful with certain electronic flash equipment manufactured by the assignee of the present invention but if other flash equipment were desired, different indicia could be carried on member 48. To facilitate a change of electronic flash equipment, the member 48 is shown attached to the wall 33 of the cup shaped member base 30 by means such as a set screw 50 (FIG. 2) in such a fashion that the member 48 may be moved around the periphery of the wall 33 of cup shaped base member 30 and then fastened in place by tightening set screw 50. Alternately, member 48 could be disc shaped and be mounted for rotational movement on hub 35. In any event, the desired radial position of member 48 would be known from the guide number of the flash equipment to be used and indicia along the back of member 48 could be used to set member 48 in the proper position. After setting, member 48 need not be moved unless flash equipment with a different guide number is employed. Of course, if only a single flash unit is expected to be used with the calculator of the present invention, the member 48 may be permanently affixed to the wall 33 in the desired position.

In FIG. 3 there is shown a disc shaped member 51 which may be a printed circuit board, upon which the electronics 29A in the box 29 of FIG. 1 may be formed in printed circuit fashion and upon which the light sensitive device 25 may also be mounted. The circuitry may comprise circuitry similar to that found in the above referenced copending application or in my above-mentioned U.S. Pat. No. 3,769,888.

Disc 51 has a central aperture 52 of size sufficient to permit the disc to be placed around hub 35 of the cup shaped base member 30 and has a portion cut away so as to accomodate the inwardly extending protrusion 42. Alternately, disc 51 could be placed above the protrusion 42 with the light sensitive device mounted downwardly therefrom. In any event, the light sensitive device and any optics that are necessary would be mounted on disc 51 so as to place them to receive light through the window 40 formed in the wall 33 within the protrusion 39 of cup shaped base member 30.

The FIGURES also show a disc member 60 of generally circular configuration and having ridges or knurls 61 along one part of the outer periphery thereof. Disc member 60 has a relatively large central opening 65. Disc 60 carries a first set of indicia 67 representative of various ASA film speeds and a second set of indicia 69 representative of various F stop settings.

Also shown in the FIGURES is a top member 70 having a generally circular shape except along one cutaway side 72 thereof. Top member 70 has a downwardly extending fluted edge 75 and in one portion carries a further downwardly extending portion 77 into which have been formed a plurality of apertures 78, 79 and 80. Apertures 78, 79 and 80 are each formed to have a different area and when used in cooperation with the aperature 40 formed in base 30 will admit varying portions of light into the interior of the calculator.

Top member 70 has an observing portion or indicator such as opening 83 of generally rectangular shape formed in one side thereof and has the indicia "ASA" along one side of the opening 83 and the indicia "*ft.*" along another side of the opening 83.

On the underneath part of top member 70 is formed a raised portion or boss 85 of generally circular configuration and of such size as to cooperate with the central opening 65 of disc 60 so that disc 60 may rotate with respect to top member 70 about a second axis 88 parallel to but displaced from the first axis 37 passing through hub 35 of base member 30.

Also extending from the underneath portion of top member 70 along first axis 37 is an axle 89 adapted to fit within the opening of hub 35 in base member 30.

In assembling the apparatus shown in the FIGURES, disc 51 carrying the desired printed circuitry and light sensitive device is placed around the hub 35 in base member 30 in such a fashion that the light responsive device will receive light through the aperture 40 in wall 33 of base member 30. The disc 51 is suitably fastened to the hub 35 as, for example, with adhesive, so that no rotation of disc 51 with respect to base member 30 will occur.

The disc member 60 carrying the ASA indicia 67 and F stop indicia 69 is rotatably mounted on top member 70 with the opening 65 of disc member 60 fitting around the boss member 85 of top member 70. A suitable connection, such as a C clip (not shown), is used for holding disc member 60 onto boss 85 of top member 70 to allow rotation of disc member 60 about second axis 88 but to prevent relative axial motion of the parts.

After disc 60 has been rotatably mounted on boss 85 of top member 70, the combination of top member 70 and disc member 60 are lowered onto the cup shaped base member 30 so that the axle 89 of top member 70 seats within the hub 35 of bottom member 30 and extension 77 of top member 70 is adjacent aperture 40 in wall 33. Again, suitable means, such as a spring bearing and groove, is supplied to hold axle 89 within hub 35 for rotation of top member 70 about axis 37 but preventing relative axial motion between the parts. When assembled, the bottom of downwardly extending fluted edge 75 will lie adjacent the top of wall 33 and the apparatus will have the appearance shown in FIG. 4.

Electrical connections not shown will be taken from the printed circuitry on disc 50 through a connector mounted in opening 43 of the inwardly extending protrusion 42 and lead wires such as 12, 13, 16 and 17 would lead therefrom to the electronic flash unit 19 and to the camera 14. Alternately, and in the preferred embodiment, a direct connection in the form of a hot shoe connector would be constructed on the bottom surface of the calculator base member 30 so as to mount the apparatus directly on the hot shoe connection of the camera. It is usually desirable to have the light sensing device mounted at the camera so that the amount of reflected light from the subject being photographed which is received by the light sensing device corresponds to the amount of reflected light received by the camera.

In operation, the photographer places the inwardly extending member 48 in such a position around the periphery of wall 33 of cup shaped member 30 as corresponds with the guide number of the photographic flash equipment he intends to employ. After this initial setting, the member 48 will not have to be set again unless different flash equipment having a different guide number is used.

Thereafter, when the photographer desires to take a picture, he may move disc 60 around axis 88 by lightly pushing his finger against the knurled portion 61 until a number appears in window 83 under the indicia "ASA." This member corresponds to the ASA film speed of the film he is using. In the setting in the FIGURES, the ASA is shown to be 50 through window 83. Assuming then that the photographer wishes to take a picture of a subject which is a certain distance away from the camera, he will turn the top member 70 about axis 37 until a number appears in window 83 above the indicia "ft." that is larger than the certain distance. In the FIGURES, a distance of 22 feet appears in window 83 indicating that the photographer may now take a picture of a subject not more than 22 feet away.

Having set the top member 70 so that the number 22 appears in window 83, a corresponding aperture on the extension 77 will have been moved adjacent to the aperture 40 in wall 33 of base member 30. In the drawings with 22 feet showing in window 83, aperture 79, which is the middle sized aperture, is shown to be adjacent the aperture 40 and thus a medium amount of light will be admitted into the interior of the calculator to be received by the light sensitive device therein.

It will be noted that when the top member 70 has been turned to expose the distance 22 feet in window 83, the rotation about axis 37 carries the disc member 60 along without producing any relative rotation between disc member 60 and top member 70. This occurs because axes 88 and 37 are separated and upon turning member 70, axis 88 moves about axis 37. It should also be noted that when the indicia 22 feet appears in window 83, there is an indication that an F stop setting of 4.0 is called for and is observed by the correspondence between the indicia 69 on disc 60 and the indicator arrowhead 46 on ridge 45 of base member 30. Thus, the photographer will know that he should set his camera at an F stop setting of 4.0 in order to take the required exposure of the subject located less than 22 feet away.

Should the photographer change to a film which has a different ASA film speed, for example, ASA 25, then the disc member 60 would be rotated about axis 88 until "25" appeared in window 83 and now an F stop 2.8 would be indicated by the correspondence between arrowhead indicator 46 of base member 30 and indicia 69 on disc 60. Likewise; should the subject to be photographed move to a greater or lesser distance, then top member 70 would be again rotated about axis 37 so as to expose either the number 14 or number 45 in window 83 (or whatever number might be used with the particular electronic flash device being employed) and, again, a different F stop setting would be indicated by the correspondence of the indicia 69 on disc 60 and the arrowhead 46 on base member 30. Each time the top member 70 is rotated about axis 37 to indicate a different maximum distance in window 83, a different aperture in the extension 77 of top member 70 becomes adjacent the aperture 40 in base member 30. Thus, a different portion of the light from the electronic flash reflected from the subject to be photographed is received by the light sensitive device mounted on the disc 51 in the interior of the calculator. For smaller distances of 22 or less feet, the smaller opening 78 is employed and for larger distances from 22 to 45 feet, the larger opening 80 is used.

It has thus been seen that I have provided a calculator for use with automatic flash equipment associated with a camera to provide the photographer with information concerning the maximum distance for properly exposed photographs corresponding to various ASA film speeds and F stop settings. I have provided this apparatus with a minimum of parts and with very simple construction. It is also seen that my apparatus provides for rotations of the various parts about their own axes without causing undesired rotations of other parts and that this has been accomplished without the use of springs or locking means. Although the present invention has been described with reference to the preferred embodiment shown, workers skilled in the art will recognize that many changes may be made without departing from the spirit and scope of the invention. For example, the particular arrangement of various size apertures formed in extension 77 of top member 70 may be replaced with an arrangement similar to that shown in my U.S. Pat. No. 3,769,888 in the form of a ramp that moves across in back of aperture 40 of base member 30 to allow varying amounts of light to enter the interior of the calculator. Alternatively, various density filters might be employed. Likewise, instead of having an axle mounted on top member 70 and a hub mounted in base member 30, the reverse is acceptable. The same is true of the arrangement of boss 85 on top member 70 and aperture 65 of disc member 60. Any sort of mounting that permits rotation of disc member 60 with respect to top member 70 about second axis 88 and rotation of top member 70 with respect to base member 30 about first axis 37 is sufficient. Also, the specific indicia shown should not be considered limiting since various ASA numbers, maximum distances and F stop settings may be required for various equipment employed. Accordingly, I do not wish to be limited by the specific disclosures herein contained and intend to be limited only by the appended claims.

I claim:

1. Apparatus comprising:
a first member including a first indicia bearing portion and a first observing portion;
a second member including a second indicia bearing portion and a third indicia bearing portion;
a third member including a second observing portion;
means mounting said second member on said third member for rotation about a first axis with the second observing portion cooperating with the second indicia to provide a first indication; and
means mounting said third member on said first member for rotation about a second axis displaced from the first axis with the second observing portion cooperating with the first indicia to provide a second indication and with the first observing portion cooperating with the third indicia to provide a third indication.

2. Apparatus according to claim 1 wherein the first indicia are representative of maximum distances associated with light producing equipment, the second indicia are representative of photographic film speeds and the third indicia are representative of camera shutter F stops.

3. Apparatus according to claim 1 wherein said first member includes a portion having an aperture therein, and said third top member includes a portion for cooperation with the aperture to admit various portions of light therethrough depending upon the relative positions of said first member and said third member.

4. Apparatus according to claim 3 wherein a light sensitive device is mounted on said first member to receive light admitted by the aperture.

5. Apparatus according to claim 4 wherein electronic circuitry connected to the light sensitive device is carried by the first member and is operable to produce a signal when a predetermined amount of light has been received by the light sensitive device.

6. Apparatus according to claim 5 wherein the electronic circuitry and the light sensitive device are carried by a printed circuit board mounted on said first member.

7. Apparatus according to claim 1 wherein the first observing portion is a visible mark on the first member and the second observing portion is a window in said third member.

8. Apparatus according to claim 1 wherein the first indicia bearing portion is movable with respect to the first member about the second axis.

9. Calculator apparatus for use with a camera and an automatic electronic flash unit comprising:
a cup shaped base member having an upwardly extending side portion with an aperture therethrough and an indicator mark thereon;
a first indicia bearing member movably mounted on the side portion;
a disc shaped member including a light sensitive device and electronic circuitry thereon fixedly mounted on said base member with the light sensitive device positioned to receive light through the aperture, the light sensitive device and electronic circuitry operable to produce a signal when a predetermined amount of light has been received;
a second indicia bearing member having a second indicia and a third indicia thereon;
a top member having a viewing aperture therein and having a downwardly extending portion with a predetermined characterization;
means mounting said second indicia bearing member on said top member for rotation about a first axis so that the second indicia are viewable through the viewing aperture;
means mounting the combination of said second indicia bearing member and said top member on said base member for rotation about a second axis spaced from the first axis so that the first indicia are viewable adjacent the second indicia through the viewing aperture, the third indicia lies adjacent the indicator mark on the base member, and the downwardly extending portion of said top member is between the aperture in the upwardly extending side portion of said base member and the light sensitive device, so that upon rotation of the top member about the second axis, the predetermined characterization of the downwardly extending portion operates to admit varying amounts of light to the light sensitive device; and means adapted to electrically connect the electronic circuitry ot the camera and to the automatic electronic flash unit.

10. Apparatus according to claim 9 wherein the predetermined characterization of the downwardly extending portion of said top member comprises a plurality of apertures of different areas.

11. Apparatus according to claim 9 in which the first indicia represent various maximum distances associated with the automatic electronic flash unit capability, the second indicia represent various ASA numbers associated with the speed of the film used in the camera, and the third indicia represent various F. stops for the shutter of the camera.

* * * * *